No. 830,921. PATENTED SEPT. 11, 1906.
F. L. ORR.
MEANS FOR TRANSMITTING ELECTRICAL IMPULSES.
APPLICATION FILED JULY 19, 1905.

2 SHEETS—SHEET 1.

WITNESSES:
W. R. Taylor
Edw. W. Byrn

INVENTOR
Francis L. Orr
BY Munn & Co.
ATTORNEYS

No. 830,921. PATENTED SEPT. 11, 1906.
F. L. ORR.
MEANS FOR TRANSMITTING ELECTRICAL IMPULSES.
APPLICATION FILED JULY 19, 1905.

2 SHEETS—SHEET 2.

WITNESSES:
M. R. Taylor
Edw. W. Byrn.

INVENTOR
Francis L. Orr.
BY Munn & Co
ATTORNEYS

UNITED STATES PATENT OFFICE.

FRANCIS LEONARD ORR, OF THURMAN, IOWA.

MEANS FOR TRANSMITTING ELECTRICAL IMPULSES.

No. 830,921. Specification of Letters Patent. Patented Sept. 11, 1906.

Application filed July 19, 1905. Serial No. 270,405.

*To all whom it may concern:*

Be it known that I, FRANCIS LEONARD ORR, a citizen of the United States, residing at Thurman, in the county of Fremont and State of Iowa, have made certain new and useful Improvements in Means for Transmitting Electrical Impulses, of which the following is a specification.

The object of my invention is, primarily, to provide a means for preventing live stock from rubbing against, reaching over, or pushing through a wire fence. This is not only destructive to the fence, requiring frequent repairs, but is also a positive source of danger to the stock, since if the fence be struck by lightning any cattle or horses which may be in contact with it are usually killed.

My invention provides a novel means whereby a slight electrical shock is transmitted throughout the entire line of wire fence and through the cattle if in contact with the fence to the ground, the device being so organized and regulated as to deliver these electrical impulses at short intervals, a speed-governing device being provided to secure practical uniformity in the intervals and to prevent the batteries from running down too rapidly.

Although illustrated and described as applied to a cattle-guard, it will be understood that my apparatus is applicable generally to the automatic transmission of intermittent electrical impulses, and especially those of the secondary current.

Figure 1:
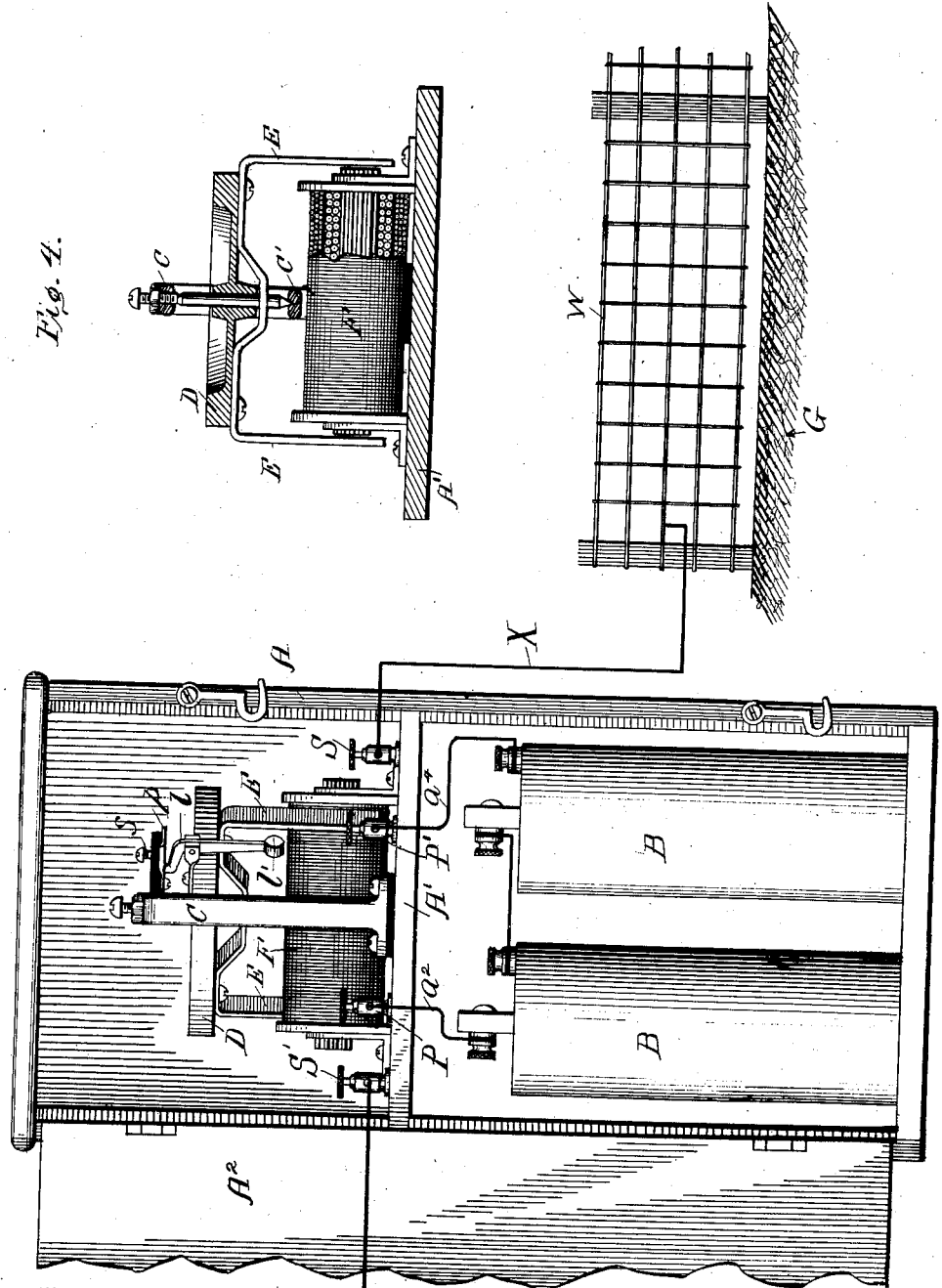
Figure 2:
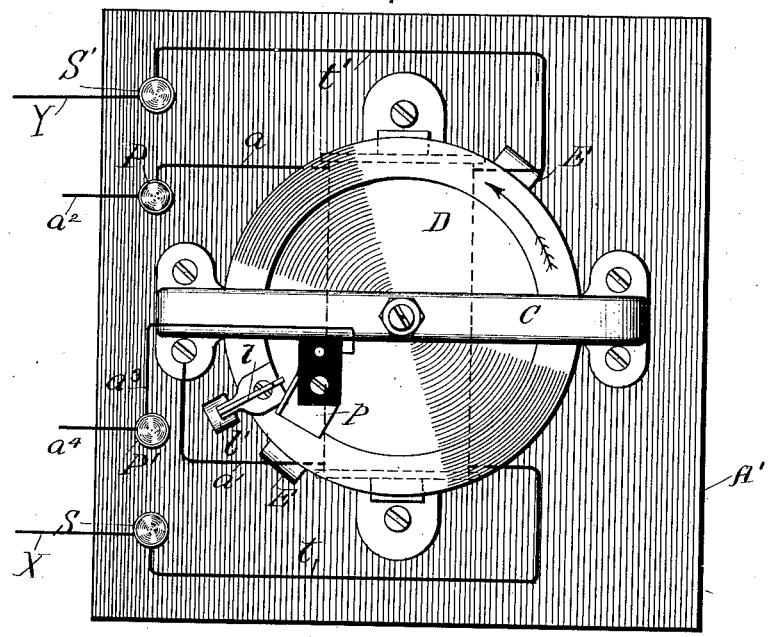

Figure 1 is a front view of the entire apparatus. Fig. 2 is an enlarged top plan, and Fig. 3 a side view, of the operating mechanism; and Fig. 4 is a sectional side view on a smaller scale.

In the drawings, A is a box having a suitable door $A^2$. This box is divided into two compartments by a horizontal partition $A'$. In the lower compartment are contained the batteries B, while in the upper compartment and mounted upon the partition $A'$ are arranged the electromechanical devices. The partition $A'$ is constructed as a removable shelf sliding in grooves in the box, so that the electromechanical devices may be conveniently withdrawn from the box for inspection, regulation, or repairs.

Figure 3:
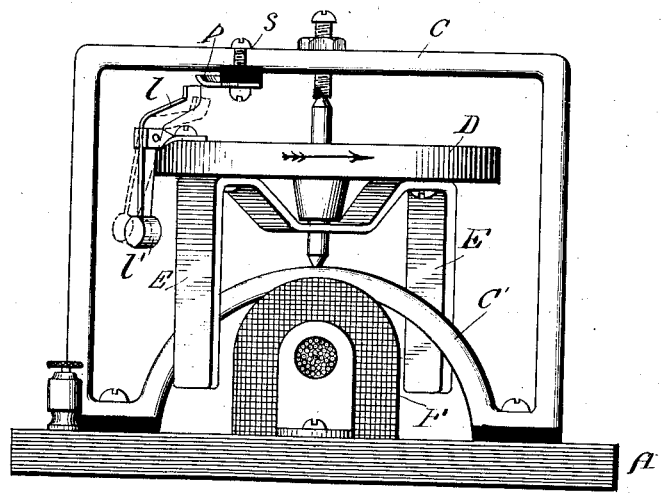

On the partition $A'$ and within the upper compartment is mounted a yoke-shaped frame C C', Fig. 3. In pivot-bearings in this frame is mounted a horizontal fly-wheel D, rotating about a vertical axis and having attached to the lower side a soft-iron armature E, the two ends of which are bent downwardly into a vertically-pendent position.

The lower member C' of the yoke-shaped frame is arched upwardly in the middle, and beneath the same in transverse position is an induction-coil F. The primary wire of the coil (see Figs. 1 and 2) has one end $a$ connected to the binding-post P and the wire $a^2$ to one pole of the battery, and the other end $a'$ of the primary wire of the coil is connected to the yoke-frame C C', the metallic fly-wheel, and thence through a circuit-breaking device to wire $a^3$, binding-post P', and wire $a^4$ to the other pole of the battery.

The circuit-breaker consists of an insulated plate $p$, fixed in stationary position on the upper part of the yoke, and a pivoted latch $l$, hinged to the edge of the fly-wheel to swing in a vertical and radial plane. On the lower end of this latch is a weight $l'$, and the upper end of the latch extends inwardly toward the center of the wheel and terminates in a toe that traverses a circular path with the wheel, which causes it at every revolution to come in contact with the stationary plate $p$, and thus close the two terminals of the primary circuit.

The two pendent ends of the armature E extend down to the plane of the poles of the coil (see Fig. 4) and are attracted thereby to rotate the wheel by so timing the closing of the circuit-closer $p\ l$ as to send an electrical impulse through the primary wire of the coil just as the ends of the armature are closely approaching the poles of the coil, as in Figs. 2 and 3. This gives a continuous rotary motion to the wheel. It will be understood that the core and primary coil form an ordinary electromagnet so far as its influence on the armature E is concerned. To regulate this motion, the latch $l$ is organized as a centrifugal governor, as well as a contact-closer, for when the wheel attains too high a speed, the weight at the lower end of the latch is thrown outwardly, and thus depresses the toe of the latch, as in dotted lines in Fig. 3, so that so long as the high speed is maintained the toe does not touch the plate and no electrical impulse is sent through the coil. When, however, the speed of the wheel is slackened and the weight gravitates to its vertically-pendent position, this movement again brings the toe of the latch up to a plane that allows it in revolving to strike the terminal plate $p$ above it. To regulate this to varying speeds, the plate $p$ is adjusted up or down by means of an adjusting-screw $s$.

From the secondary winding of the induction-coil its terminals $t\ t'$ lead, respectively, to the two binding-posts S S'. These are the terminals through which the sharp secondary impulses are sent throughout the fence-wire and through the live stock that may be in contact with the same. For this purpose a wire X connects one of the binding-posts S to the wire fence W and a wire Y connects the other binding-post S' with the ground G. Now it will be seen that if an animal standing on the ground rubs against or touches the fence-wire a shock will be given the animal, which thus completes the circuit to the earth. As the impulses sent over the fence are of regular recurrence, it will be seen that the animal will soon learn to avoid contact with the fence.

With my attachment wire fences need not be made so strong nor of such heavy material and fewer wires and fewer posts may be used, thus saving a large cost of construction.

After the animals have become educated to avoid the fence the apparatus may be detached.

The apparatus is designed to be run quite slowly, so as to economize the battery strength. An impulse each second will ordinarily be sufficient, and as the circuit is only closed for a very brief period at the intervals the strength of a few cells of the ordinary dry-cell battery will be sufficient to last for a long time.

Instead of using a battery any electrical generator may be used, or current to run the apparatus may be taken from supply-wires from any suitable station.

Having thus described my invention, what I claim as new, and desire to secure by Letters Patent, is—

1. A device for sending intermittent charges of electricity, comprising an electromagnet a rotating member turned by the electromagnet, a circuit-breaker having one of its terminals mounted on the rotating member and organized as a centrifugal governor to close the circuit only below a definite speed.

2. A device for sending intermittent induced charges of electricity, comprising an induction-coil, a rotating member having an armature turning in front of the poles of the induction-coil, a circuit-breaker for the primary wire of the coil having one of its terminals mounted on the rotating member and organized as a centrifugal governor to close the primary circuit only below a definite speed, and circuit-wires for taking off the secondary or induced impulses.

3. The means for sending a succession of secondary electrical impulses, consisting of a horizontal induction-coil, a horizontal wheel mounted above the induction-coil and having one or more armature extensions projecting downwardly from the wheel to a position in front of the poles of the induction-coil, and a circuit-breaker having one terminal of the same stationary and the other mounted on the said wheel, substantially as described.

4. The means for sending a succession of secondary electric impulses consisting of a horizontal induction-coil, a horizontal wheel mounted above the induction-coil and having one or more armature extensions projecting downwardly from the wheel to a position in front of the poles of the induction-coil, and a circuit-breaker having one terminal of the same stationary and the other constructed as a centrifugally-acting latch and mounted on the wheel, substantially as described.

FRANCIS LEONARD ORR.

Witnesses:
J. WITHERS,
MARK MORROW.